US005092571A

United States Patent [19]

Stevens

[11] Patent Number: 5,092,571

[45] Date of Patent: Mar. 3, 1992

[54] SAWBUCK

[76] Inventor: Brian L. Stevens, 77 Kingsford Court, Kanata, Ontario, K2K 1V1, Canada

[21] Appl. No.: 263,527

[22] Filed: Oct. 27, 1988

[30] Foreign Application Priority Data

Oct. 25, 1988 [CA] Canada .................................. 581149

[51] Int. Cl.[5] ............................................. B23Q 3/00

[52] U.S. Cl. .................................. 269/296; 269/131; 269/902

[58] Field of Search .................. 269/37, 43, 130, 131, 269/296, 902

[56] References Cited

U.S. PATENT DOCUMENTS

| | | | |
|---|---|---|---|
| D. 203,624 | 2/1966 | Smith | D54/1 |
| 31,605 | 3/1861 | Ives | 269/296 |
| 77,779 | 5/1868 | Stanley . | |
| 162,799 | 5/1875 | Collins | 269/296 |
| 169,343 | 11/1875 | Disston | 269/296 |
| 175,500 | 3/1876 | Redmond | 269/296 |
| 274,304 | 3/1883 | Floyd | 269/296 |
| 654,134 | 7/1900 | Clark | 269/296 |
| 931,793 | 8/1909 | Ott | 269/296 |
| 951,399 | 3/1910 | Kemp | 269/296 |
| 1,092,974 | 4/1914 | Callison | 269/296 |
| 3,034,546 | 5/1962 | Parsons | 182/153 |
| 4,014,405 | 3/1977 | Breisch | 182/181 |
| 4,386,677 | 6/1983 | Gulezian | 182/154 |
| 4,566,559 | 1/1986 | Van Asten | 182/224 |

FOREIGN PATENT DOCUMENTS

| | | | |
|---|---|---|---|
| 18703 | 7/1884 | Canada . | |
| 44863 | 9/1893 | Canada . | |
| 667972 | 8/1963 | Canada . | |
| 1095382 | 2/1981 | Canada | 143/79 |
| 2916831 | 11/1980 | Fed. Rep. of Germany . | |
| 2437915 | 4/1980 | France . | |

*Primary Examiner*—J. J. Hartman

*Attorney, Agent, or Firm*—Arnold, White & Durkee

[57] ABSTRACT

Disclosed is a molded plastic sawbuck having two end supports and a crossbar. Each end support has a hub and four integrally molded support legs radiating therefrom. The crossbar can be integrally molded to the hubs of the end supports or the end supports may have a bore in the hub for detachable association with the crossbar. The crossbar is preferably non circular in cross section and has a spinner thereon which protects the crossbar from the chainsaw. Two legs of each end support are shorter than the other two legs and the relative orientation and length of the leg is such that the sawbuck can be rotated from its normal position so that material to be cut such as a log can be supported on sloping ground or supported on level ground such that the height a heavy log has to be lifted over the tops of the legs is reduced. The legs may have apertures or apertured lugs associated therewith whereby a carrying strap can be connected to the sawback to carry it into the bush. The carrying strap also serves as a log or material holddown strap when desired.

16 Claims, 4 Drawing Sheets

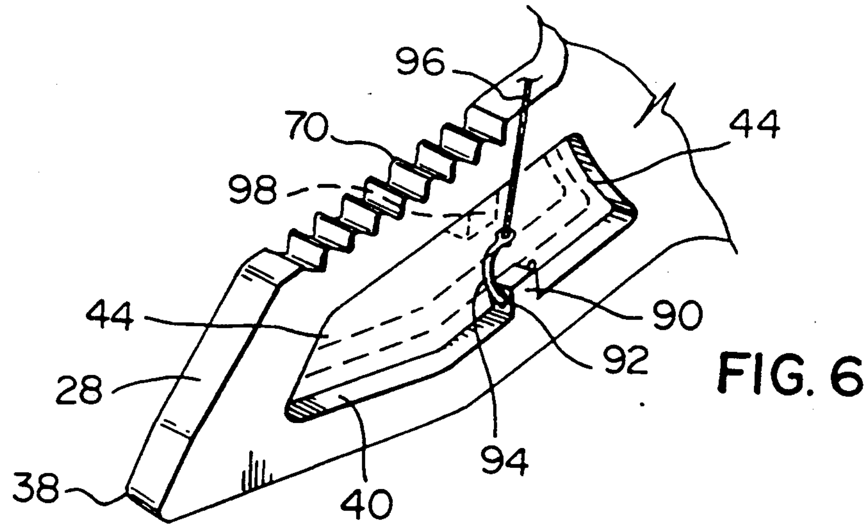
FIG. 6
FIG.8
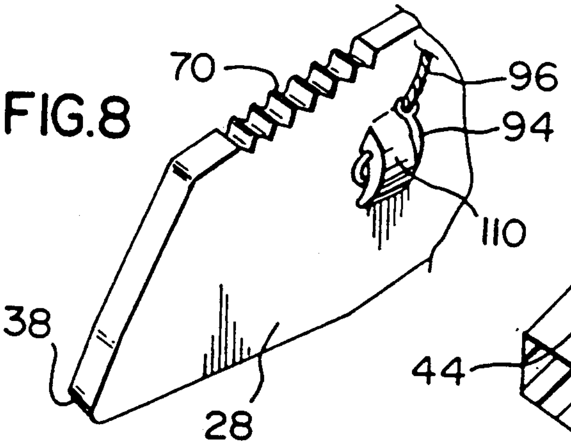
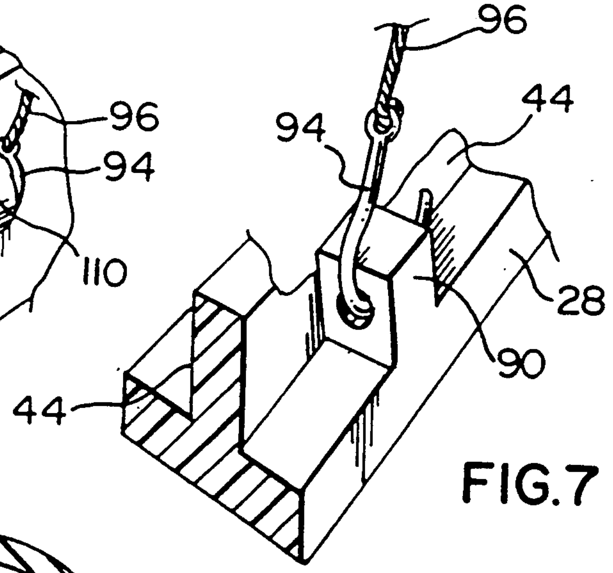
FIG.7
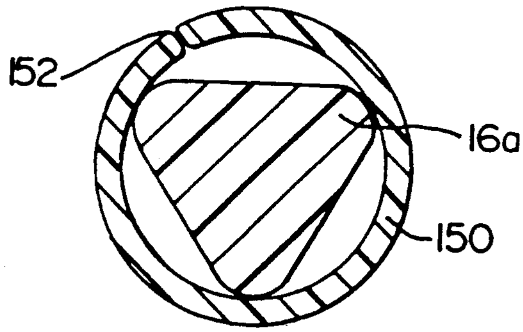
FIG.13

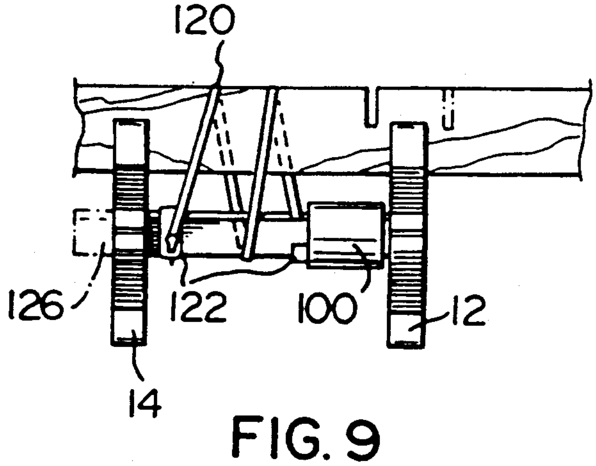
FIG. 9
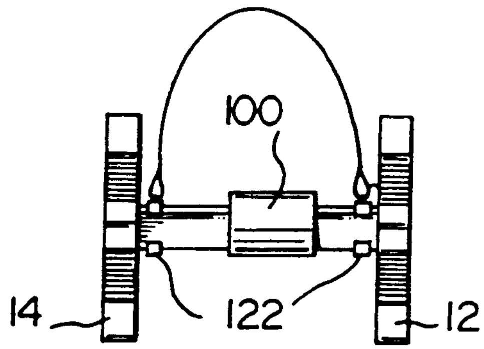
FIG. 10
FIG. 11
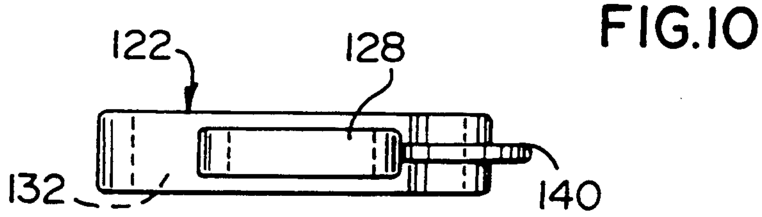
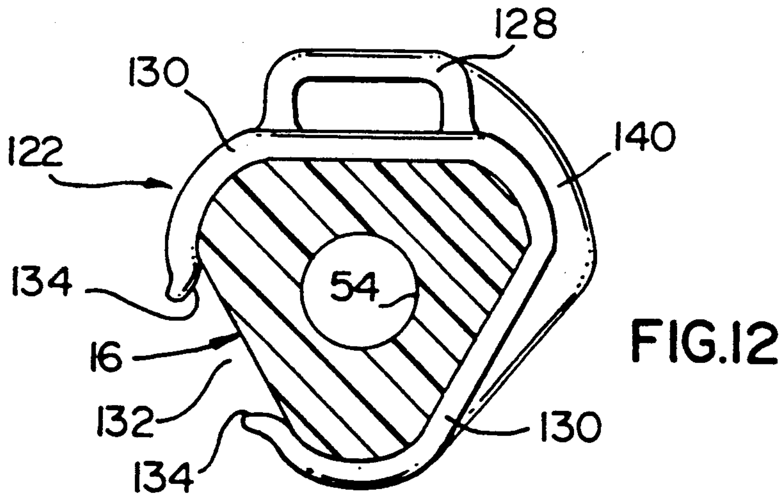
FIG. 12

SAWBUCK

FIELD OF THE INVENTION

This invention relates primarily to sawbucks and more particularly to a sawback specifically designed and constructed to cut firewood with chainsaws. However, it also has potential use on construction sites or in the home for the sawing of lumber, plywood and plastic pipe with circular saws and the like.

BACKGROUND OF THE INVENTION

Sawbucks or sawhorses have been known for many years for use in sawing firewood and the like, particularly with hand saws.

Chainsaws are now commonly used to cut wood and often firewood is chainsawed where it is found, directly on the ground or very close to it, thus resulting in the danger of the fast-moving saw chain striking the ground immediately after it passes through the log. This can lead to a dangerous kickback of the saw blade or the immediate dulling of the cutting edges due to the abrasive nature of the earth or rocks struck.

Sawbucks have historically taken the form of two spaced apart end supports comprised of legs in the form of an "x" which support the firewood at approximately waist level.

Such sawbucks have been used with chainsaws but they have not proved to be entirely satisfactory. Cutting logs with a chainsaw on the usual sawbuck can be dangerous since the log is usually held at waist height where the operator has less muscle control over the saw and any kick back has a tendency to lift the saw blade dangerously high toward the neck and head. Chainsaw cutting is preferably done below waist level. Further, it is common for an operator to go into the woods to find suitable wood and cut the trees into liftable lengths (usually larger than firebox lengths) for transport out of the woods and subsequent cutting into firebox lengths Previous sawbucks, including folding ones, are large and awkward to transport manually into the woods along with the chainsaw and other associated equipment.

Instead, in order to keep a chainsaw from contacting the ground after felling a tree in the woods, an operator sometimes attempts to prop up at least the end of the log before making a cut. To do this, he may search for another liftable log or failing that, hope to use the first log cut as the prop for subsequent cuts taking a chance that he will not hit the ground on the first cut. This procedure is bothersome and instead, the entire log will often be sawed directly on the ground.

Seldom, if ever, does the operator carry a sawbuck with him because of its size and weight. Even if there is a sawbuck handy, the ground may be sloping so that it is difficult to level the sawbuck for safe use with a chain saw or the sawbuck's size requires that the log must be lifted too high.

To be truly portable, sawbucks should be small, easy to dismantle and assemble and yet, when assembled, be sturdy.

It is also desirable to construct a sawbuck for chainsaws which provides some protective means for the cross brace in the event that, when making a cut between the end supports, the cross brace will not be damaged if the saw blade happens to drop after the cut has been made. At the same time, the sawbuck should be constructed of a material which will not damage the saw blade if contact is accidentally made.

Construction projects and home repairs often involve the sawing of lumber, plywood or various types of pipe with either a chainsaw, a circular saw, or a jigsaw. The lack of a readily available support system for the material to be sawed can lead to inconvenience and/or unsafe procedures, in particular on sloping surfaces such as a roof or hillside.

Accordingly, there is a need for a simply constructed, downsized, cost effective sawbuck which is easily transportable, assembled or disassembled and primarily directed for operation with a chainsaw and having means for protecting the cross brace and minimizing potential damage to the saw chain.

SUMMARY OF THE INVENTION

Broadly the invention in one aspect pertains to a molded plastic sawbuck apparatus comprising two end support members and an integrally molded crossbar, each end support member having a hub portion and four integrally molded support legs radiating therefrom, two of the legs being shorter than the other two legs. The crossbar is integrally molded between the hub portions of the end support members and the relative orientation and length of the legs is such that the sawbuck can be rotated from its normal position so that material to be cut can be supported on sloping ground or supported on level ground such that the height a heavy material has to be lifted over the tops of the legs is reduced.

In another aspect, the invention seeks to provide a sawbuck having two end supports and a single crossbar, all made of a material such as plastic to minimize the possibility of damage to the saw chain. Each end support has an integrally molded plastic hub and four support legs radiating therefrom. Two adjacent support legs are shorter than the other two legs. The hub has a bore therethrough and the crossbar is of molded plastic having a cross-sectional configuration for securement within the hub bores. The relative orientation and length of the legs when the end supports are secured to the crossbar are such that the sawbuck can be rotated so that a log or other material to be cut can be supported on sloping ground with a longitudinally spaced pair of the longer legs downhill relative to the shorter legs. When used in this configuration on level ground, the material can be lifted onto the sawbuck more easily and supported at a lower elevation than when the sawbuck is used in the normal upright position. This can be useful where the material to be sawed is very heavy.

Preferably the end of each leg is pointed so that the point is on the centerline of the leg, the points of the longer legs being sharper and longer than the points of the shorter legs so that in all operating positions of the sawbuck, only the tips of the legs make contact with the ground and stability is maximized.

Still more preferably, each hub bore and the crossbar in cross-section are of triangular configuration with rounded apexes, the orientation of the crossbar such that a side of the triangularly configured crossbar confronts a log when supported between the two shorter legs and at least one end support member is detachably secured to the crossbar. The non-circular cross-section of the crossbar and hub bore also provide great axial rigidity to the assemblage.

Further the sawbuck apparatus preferably has a plastic spinner on the crossbar with an inner diameter such as to rotate on the apexes of the crossbar when contacted by the moving chain of a chainsaw.

The apparatus may also include a stretchable hold-down/carrying strap, the sawbuck and ends of the strap having cooperating means whereby the strap can be used both to hold a log to be cut against adjacent confronting legs (thereby preventing rotation of the log) and as a carrying strap to transport the sawbuck apparatus as desired.

Another aspect of the invention comprehends a sawbuck apparatus comprising two end support members and a single crossbar, each end support member having an integrally molded hub and four support legs radiating therefrom, the legs having ends pointed to the respective centerline thereof. The hub of each support has a non-circular bore therein,. and the crossbar is of molded plastic and has a cross-sectional configuration for detachable securement with the hub of the end support members. A spinner is on the crossbar protecting the crossbar from accidental contact with teeth of a saw when a log or other material has been cut between the end supports and reducing further the possibility of saw kick-back.

A still further aspect of the invention comprehends a kit for assembly of a sawbuck comprising an elongate crossbar of extruded plastic having a predetermined cross sectional configuration. There are two identically molded end supports each having a central hub and four legs radiating therefrom, the hub having a bore therethrough of a cross-sectional configuration for sliding assembly with a respective end of the crossbar. Means (such as a set screw) are provided for detachably securing the end supports to the crossbar. Each end support has two adjacent legs shorter than the other two legs and the ends of the legs are pointed at the centerline thereof, the points of the longer legs being sharper than the points of the shorter legs. The kit may also include a replaceable piece of plastic spinner pipe and a hold-down strap.

Other aspects and features of the invention will become more apparent from an appreciation of the description herein of preferred aspects of the invention.

DESCRIPTION OF THE DRAWINGS

FIG. 6 is an enlarged perspective view of one of the legs of the sawbucks as seen in FIGS. 1, 3 and 4.

FIG. 7 is a further enlarged perspective view of part of the leg as shown by circle 7—7 in FIG. 6.

FIG. 8 shows part of a modified leg of an end support and a modified means of securing the holddown/carrying strap to the leg.

FIG. 9 is a side elevational view of the sawbuck showing an alternative means—clips 13 for securing the strap to the sawbuck for holding down a log.

FIG. 10 is a side elevational view like FIG. 9 but showing the strap associated with the crossbar for carrying the sawbuck.

FIG. 11 is an enlarged plan view of the clip means of FIGS. 9 and 10.

FIG. 12 is an enlarged elevational view of the clip means of FIGS. 9 and 10 with the crossbar shown in section.

FIG. 13 is a cross-sectional view of a modified spinner.

DESCRIPTION OF THE PREFERRED EMBODIMENT

Figure 1:
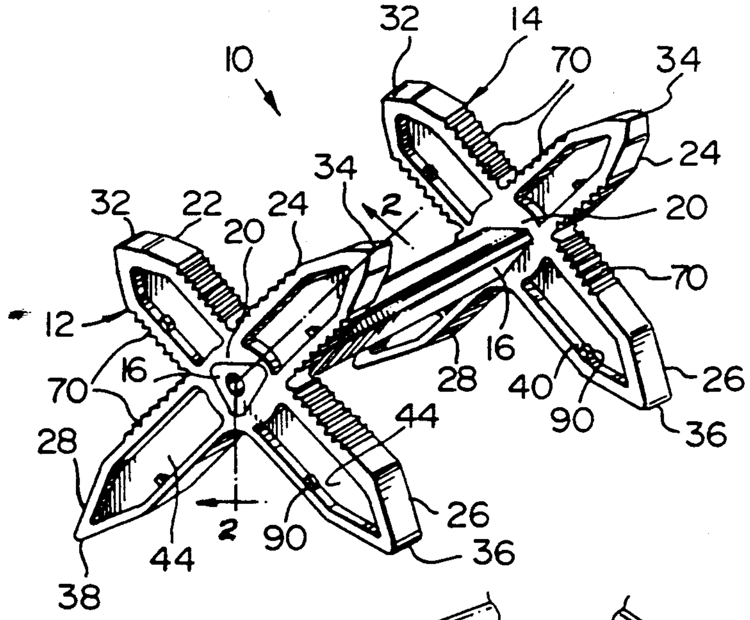
FIG. 1 is a perspective view of the sawbuck of the invention.

Turning now to the drawings, sawbuck 10 comprises identical, integrally molded end supports 12 and 14 each having a hub 20 detachably connected to molded (or extruded) crossbar or cross brace 16 which is non-circular in cross-section.

End supports 12 and 14 each have four legs 22, 24, 26 and 28 extending generally radially from hub 20 with legs 22 and 26 diametrically opposed and legs 24 and 28 diametrically opposed. As particularly seen in FIG. 3, legs 22 and 24 are shorter than the legs 26 and 28 and all legs have pointed ends, the points 32, 34 of legs 22 and 24 being shorter than points 36, 38 of legs 26 and 28 but all points substantially on the centerline of the respective leg.

The pointed legs provide excellent grip and maximum stability on rough ground in any axial position and allow logs to be slid toward the center "V" between adjacent legs in any one of three rotated positions of the sawbuck as will become more apparent herein.

Each leg 22, 24, 26 and 28 has opposed recesses 40 and 42 with web 44 therebetween whereby the cross-sectional shape or configuration of each leg, intermediate its respective point and hub 20, is an "I" beam.

Hub 20 is integrally moulded with legs 22, 24, 26 and 28 and contains non-circular aperture 50 which mates with non-circular bar 16. Bar 16 has a triangular configuration with rounded apexes 52 in cross-section or end view. Central bore 54 extends longitudinally of bar 16 and serves to reduce the weight of bar 16. Bar 16 and hub aperture 50 are configured such that close but sliding fit is provided so that either or both end supports 12 and 14 can be selectively moved along bar 16.

Figure 2:
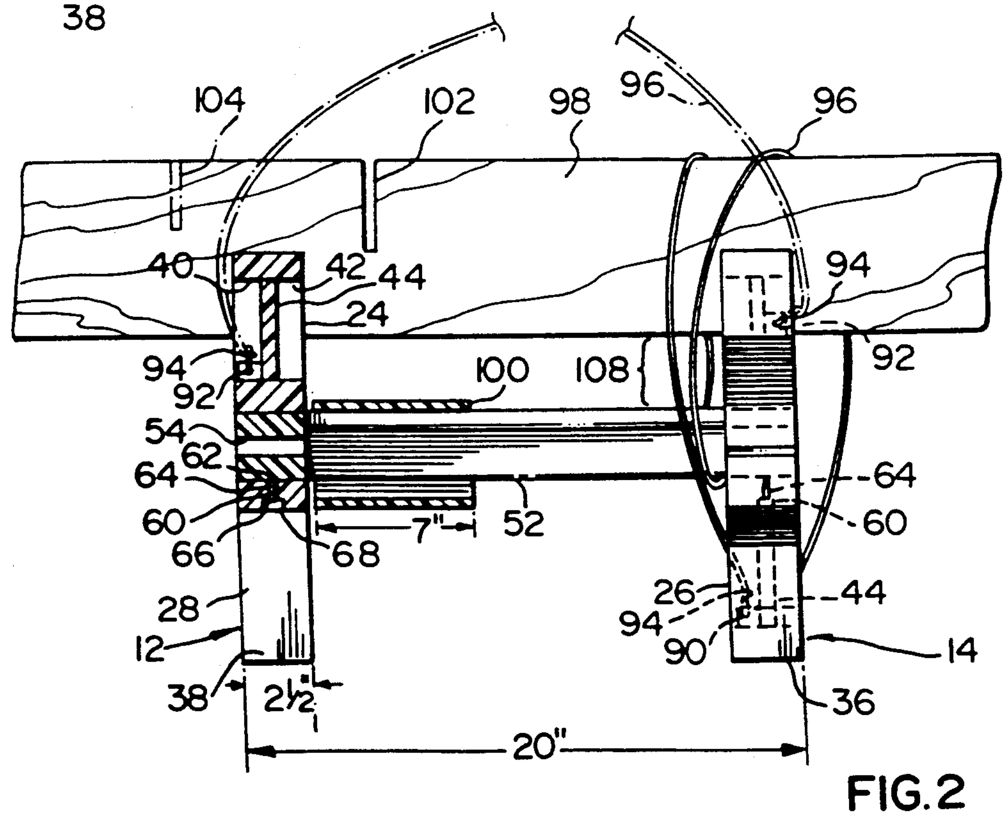
FIG. 2 is a partly sectional, side elevational view of the sawbuck of this invention showing the holddown/-carrying strap in a holddown position (solid lines) and carrying position (dotted lines).

As particularly seen in FIG. 2, fastener device 60 detachably secures each end support 12 and 14 to bar 16 and is shown as a set screw having an end 62 which engages small aperture 64 near the end of bar 16. Head 66 of fastener 60 is shown recessed in hub recess 68 adjacent the junction of legs 26 and 28. It will be appreciated however that the head of fastener 60 could be exposed and in the form of a "wing" headed bolt or the like. Aperture 64 in bar 16 assists in locating respective end supports 12 and 14 at the ends of bar 16. It will be apparent however that aperture 64 is not necessary and when an end support is adjusted inwardly along the crossbar, end fastener 62 simply contacts the adjacent apex 52 of bar 16. As noted before, the fit between hub aperture 50 and bar 16 is such that a close but sliding fit is provided and when assembled, the width of hub 20 relative to the length of the legs and bar provides a sturdy structure, both axially and longitudinally.

Figure 5:
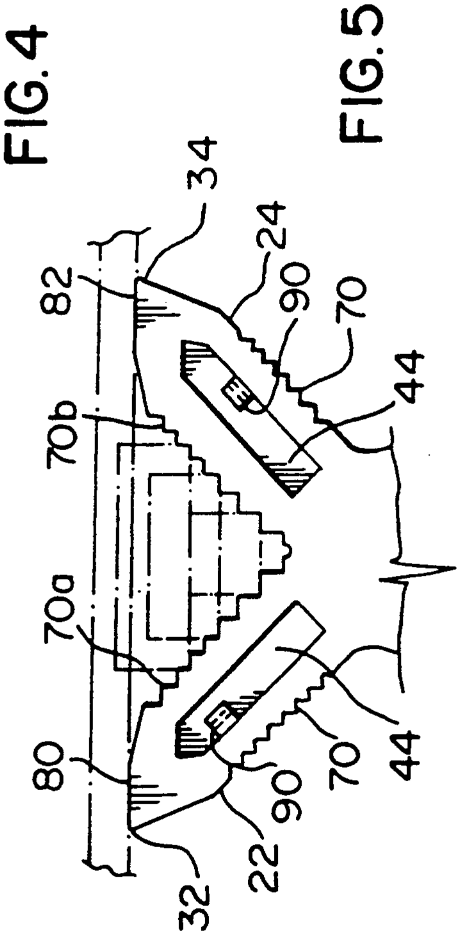
FIG. 5 is an enlarged end view of part of an end support showing a preferred form of the teeth adapted to hold standard lumber sizings such as 2×2's, 2×4's and 2×6's.

As shown in the drawings, particularly FIGS. 1 and 2, each side of legs 22 and 24 have teeth 70 and the sides of legs 26 and 28 confronting legs 22 and 24 have teeth 70. Teeth 70 are formed in molding end supports 12 and 14 and provide means to prevent or lessen the tendency of logs to spin while being cut by a fast moving chainsaw. Preferably, the particular shape and spacing of the teeth on all legs is such as to firmly position lumber of standard sizes for end cuts using a circular saw as well as sheets of plywood, particle board and the like. As shown in FIG. 5, which is an enlarged end view of part of the legs 32 and 34 of support 12, a configuration of the teeth to accept lumber or sheets of wood (as well as firewood logs) is shown. The teeth 70*a* and 70*b* are formed such that the horizontal spacing between such teeth accommodate a standard piece of lumber, shown in phantom lines, such as 2×2 (74), 2×4 (76), 2×6 (78) and the like.

The upper surfaces 80 and 82 of legs 32, 34 are substantially flat or planar near the tips so that a sheet of plywood 84, shown partly in phantom, may lie on top of legs 32 and 34 of each end support 12.

Teeth 70*a* and 70*b* also provide the necessary means for reducing the tendency of a log to rotate when being cut with a chainsaw.

As more particularly shown in FIGS. 3, 4, 6 and 7, each leg has an integrally molded lug 90 with an aperture 92 formed therein. The aperture 92 permits hook portion 94 of stretchable holddown strap 96 to be inserted as particularly shown in FIG. 7. A lug 98, shown in dotted lines in FIG. 6, is on the other side of web 44. Although only one lug 90, 98 has been shown on each side of the support legs, additional lugs can be formed on each leg as desired.

As shown in FIG. 2, strap 96, in solid lines, has a hook 94 connected with aperture 92 of lug 90 of leg 26 of support 14 and is wrapped around log 98 and bar 16 with another like hook (not shown) connected with leg 28 of the same support. Strap 96 is of the stretchable rubber-type similar to holddown straps used in association with car top carriers and the like. Strap 96 also provides a convenient carrying (shoulder) strap (dotted line in FIG. 2) so that sawbuck 10 can be carried into the woods or to where logs are to be cut. It will be appreciated that hooks 94 would be connected to respective apertures 92 of a pair of "upper" legs (e.g. legs 22, 24) when strap 96 is used for carrying purposes. Hooks 94 however can be connected with the lug 90 of any leg when strap 96 is used as a holddown strap. Preferably however, strap 96 is connected to "lower" legs 26 and 28. Obviously the number of turns of strap 96 made about log 98 (and turns about bar 16, if any) will depend on the length of strap 96 and the size of the log being cut.

As shown in FIGS. 2, 3, 4 and 9, spinner 100 comprises a length of cylindrical plastic such as commercially available 3" drain pipe (about 3/32" thick) which can spin on bar 16 if by chance a chainsaw happens to drop after cutting a log over the bar 16, (e.g. at cut 102 in FIG. 2 rather than beyond an end support 12 such as cut 104). Spinner 100 saves bar 16 from being damaged and is easily replaceable, if damaged. It also further reduces the possibility of kickback of the saw blade by yielding to the motion of the saw chain. Spinner 100 need not fill the length of the bar 16 between supports 12 and 14 since the supports are longitudinally moveable on bar 16 and the spinner can be easily positioned under the intended saw cut. It will also be appreciated that spinner 100 is supported effectively at three areas, the curved apexes 52 of bar 16.

The orientation of the three apexes 52 of bar 16, as shown in the drawings relative to the junction of legs 22 and 24, provides spacing 108 (as well as spacing between the inside of spinner 100 and bar 16) which is the greatest depth between the bottom of a log and bar 16 in normal use of the buck so that if spinner 100 is not used or by chance not in its proper location when cutting a log between supports 12 and 14, a drop of the chainsaw is less likely to strike bar 16 because of the spacing 108.

Figure 4:
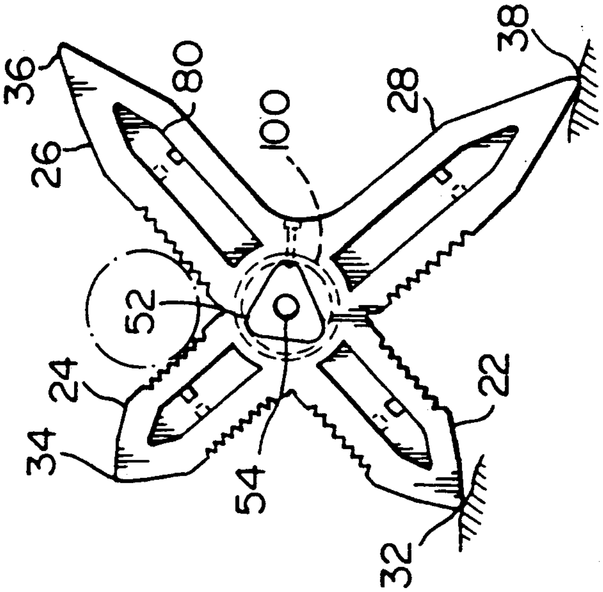
FIG. 4 is an end elevational of the sawbuck like FIG. 3 but rotated 90°.

It will be appreciated that if uneven ground is encountered, sawbuck 10 can be rotated 90°, as shown in FIG. 4, whereby a log is supported between one of the longer legs 26 and the adjacent shorter leg 24, the sawbuck safely holding the log on sloping terrain with the longer leg being positioned on the downhill side. It will also be appreciated that since each leg has lug means 90, a log can, if necessary, be safely held down by strap 96 whenever sawbuck is rotated for cutting logs on uneven terrain. Further, it will be appreciated that with very heavy logs it may be desirable to rotate sawbuck 10 as in FIG. 4 even when on level ground since then the vertical distance to raise such log over point 34 is only 12" rather than the 15" as shown in FIG. 4.

Variations in and modifications of the structure of the sawbuck apparatus have been noted already herein and others will be apparent to those skilled in the art.

By way of example, if end supports 12 and 14 are molded solid in cross-section or formed in a hollow box-beam design, that is, without web defining recesses 40 and web 44, then securement means such as knob or hook element 110 seen in FIG. 8 can be integrally molded as part of the legs.

A further modification, as shown in FIGS. 9–12, is the provision of a strap 120 with molded strap clips 122 which are adapted for connection with bar 16. If desired, one end of strap 120 with clip 122 can be coupled with a portion of bar 16 outboard of support 14, when the support is inward of the adjacent end of bar 16 as shown in dotted lines at 126 in FIG. 9.

As seen in FIGS. 11 and 12, clip 122 of die cast, molded plastic, has loop 128 for securement to strap 120 and bar encircling portion 130. Portion 130 has opening 132 with ends 134 which are designed for camming over the periphery of bar 16 when clip 122 is connected to bar 16, and for manually prying apart as necessary, to disconnect clip from bar 16. Clip flange 140 reinforces encircling portion 130 opposite opening 132.

Figure 3:
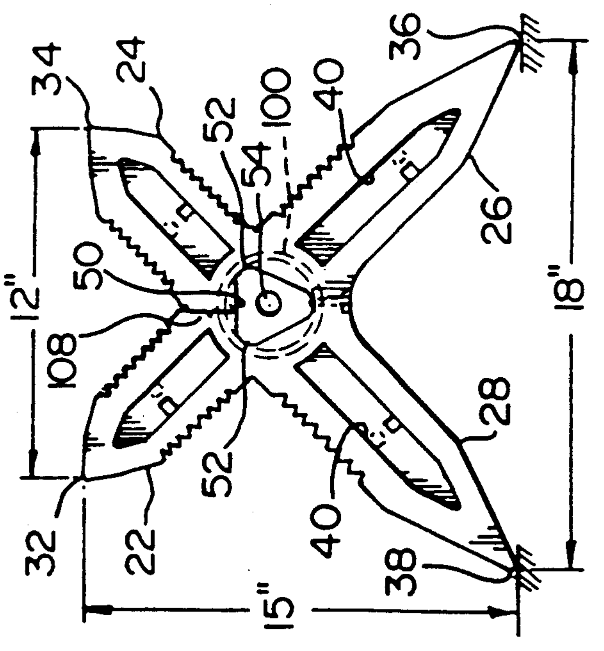
FIG. 3 is an end elevation of the sawbuck of this invention showing in dotted lines the cross bar protector (or spinner).

By way of further illustration of the construction of sawbuck 10, I disclose and illustrate in FIGS. 2 and 3, some exemplary measurements. The distance between points 36 and 38 of the larger loop is about 18 inches whereas the distance between points 32 and 34 of the shorter loop is about 12 inches. The overall height in the upright position is about 15 inches.

The perpendicular length of the points 36 and 38 of the longer legs is about 4½ inches whereas the perpendicular length of points 32 and 34 of the shorter legs is about 2½ inches.

Each leg is about 2½ inches wide with the thickness at the points of about 2 inches. Web 44 is about ¼ inch thick and bar 16 has apexes 52 on a radius of about 1½ inches with about a ½ inch radius central bore. Bar 16 is about 20 inches long.

Although I have disclosed the use of a setscrew type fastener 60 between end supports 12 and 14 and bar 60, it will be apparent that a "wing" headed screw could be used for at least one of the fasteners to permit easy adjustment without the need for tools.

I have shown a preferred embodiment with various features. However, my invention also comprehends a totally integrally molded sawbuck including end supports and cross bar. Legs of the end supports would have different lengths as noted before and as shown in FIG. 13 a modified spinner 150 can be detachably assembled to the solid crossbar 16*a*. Spinner 150 may be made simply by making longitudinal saw cut 152 along a standard piece of thin wall plastic sewer pipe. The natural spring in the plastic would return it substantially to cylindrical form after its assembly with the crossbar. However a longitudinally split spinner could be formed with two integral semi-cylindrical portions joined by a hinge of reduced material (not shown) with confronting detachable interlocking flanges (not shown) running longitudinally of the spinner.

Accordingly, I have provided a sawbuck which is downsized for safe use with a chainsaw and which is easily portable. The strong end joint arrangement between hub 20 and bar 16 eliminates the need for additional side or cross braces and thereby allows the cutting action to be carried out between the end supports if desired, regardless of which rotated position the device is used in. Further, the position of the end supports on the crossbar is adjustable allowing short logs or wood to be cut even shorter and allows for total disassembly for easy transportation in a vehicle or for storage. The feet are tapered or pointed to provide maximum grip and stability in use with two of the legs being longer than the other two so that the buck will hold a log safely on sloping terrain.

The buck may also be stood on end so that it acts as a support for the chainsaw when starting its motor.

Further, I have provided a sawbuck which may include a spinner device on a non-circular crossbar to prevent or lessen potential contact between a saw and crossbar 16 after a cut. A strap assembly is also provided for use both as a carrying strap and a holddown strap as desired.

Still further, I have provided a sawbuck which includes teeth which are configured and spaced for immobilizing standard lumber sizes when sawing such lumber with a chainsaw, circular saw or jigsaw.

My sawbuck is preferably molded of a strong plastic such as ABS and is of a color such as bright orange which will cause it to stand out when transported into the woods and be readily distinguished from any wood that is being cut on it.

It will be recognized that many of those features of this sawbuck could also be useful in the home and on construction sites for the purpose of sawing lumber, plywood or plastic pipe with a chainsaw, circular saw or jigsaw.

The embodiments of the invention in which an exclusive property or privilege is claimed are defined as follows:

1. A molded plastic sawbuck apparatus comprising:

two end support members and a crossbar;

each said end support member having a hub portion and four integrally molded support legs radiating therefrom, two of said legs adjacent each other being shorter in length than the other two legs;

said crossbar being integrally molded between the hub portions of said end support members;

the relative angular orientation and length of adjacent legs being such that said sawbuck can be rotated about 90° from a first position wherein a log to be cut is supported between the shorter legs on substantially level ground and a second position wherein a log to be cut is supported between a shorter leg and a longer leg on sloping ground whereby the height a heavy log has to be lifted over the tops of the legs is reduced; and the end of each leg being pointed substantially along the centerline thereof, the points of the longer legs being sharper than the points of the shorter legs.

2. The sawbuck apparatus of claim 1 wherein said crossbar in cross-section is of triangular configuration with rounded apexes.

3. The sawbuck apparatus of claim 1 including a stretchable holddown/carrying strap, said apparatus and ends of said strap having cooperating means whereby said strap can be used to hold material to be cut against adjacent and confronting legs and alternatively used as a carrying strap to transport said sawbuck apparatus.

4. Sawbuck apparatus comprising:

two end support members and a single crossbar, each of said end support member having an integrally molded plastic hub and four support legs radiating therefrom, two of said legs being shorter in length than the other two legs, said hubs each having a bore therethrough;

said crossbar being of molded plastic and having a cross-sectional configuration for rigid securement within said bores, the relative angular orientation and length of said adjacent legs when said end supports are secured to said crossbar such that said sawbuck can be rotated about 90° from a first position wherein a log to be cut is supported between the shorter legs on substantially level ground and a second position wherein a log to be cut is supported between a shorter leg and a longer leg on sloping ground whereby the height a heavy log has to be lifted over the tops of the legs is reduced; and the end of each leg being pointed substantially along the centerline thereof, the points of the longer legs being sharper than the points of the shorter legs.

5. The sawbuck apparatus of claim 4 wherein each hub bore and said crossbar in cross-section are of triangular configuration with rounded apexes.

6. The sawbuck apparatus of claim 5 wherein a side of the triangularly configured crossbar confronts a log when supported between the two shorter legs and at least one end support member is detachably secured to said crossbar.

7. The sawbuck apparatus of claim 4 including a stretchable holddown/carrying strap, said apparatus and ends of said strap having cooperating means whereby said strap can be used to hold a log to be cut against adjacent and confronting legs and alternatively used as a carrying strap to transport said sawbuck apparatus.

8. The apparatus of claim 4 wherein at least one said end support member is movable on said crossbar thereby adjusting the length of the sawbuck, and means to detachably secure said at least one member to said bar.

9. The apparatus of claim 4 wherein at least two confronting legs have teeth for reducing the tendency of material being cut from moving relative to the legs.

10. The apparatus of claim 9 wherein said teeth are configured so as to reduce an annular shaped material from rotating and to laterally immobilize rectangular-shaped lumber of various standard sizes and retain such lumber generally horizontally in recesses defined by said teeth.

11. A kit for assembly of a sawbuck comprising:

an elongate crossbar of extruded plastic having a predetermined cross sectional configuration;

two identically molded end supports each having a central hub and four legs radiating therefrom, said hub having a bore therethrough of a cross-sectional configuration for sliding assembly with a respective end of said crossbar, means for detachably securing said end supports to said crossbar;

each end support having two adjacent legs shorter in length than the other two legs and the ends of the legs being pointed substantially along the centerline thereof, the points of the longer legs being sharper than the points of the shorter legs;

the relative angular orientation and length of confronting legs being such that in operative association with the crossbar, the sawbuck can be rotated about 90° from a first position wherein a log to be cut is supported between the shorter legs on substantially level ground and a second position wherein a log to be cut is supported between a shorter leg and a longer leg on sloping ground whereby the height a heavy log has to be lifted over the tops of the legs is reduced.

12. The kit of claim 11 including stretchable strap means having hook means on opposed ends thereof, at least some of the legs of said end supports having means for operative cooperation with said strap means whereby said strap means can be used as a carrying strap for the assembled sawbuck or used to hold down material on the sawbuck while being cut.

13. A molded plastic end piece for a sawbuck, comprising:

a hub portion having an aperture therethrough adapted to contain an end of a crosspiece in association with which the end piece is used;

four legs radiating from said hub, two of said legs being longer than the other two, with each short leg diametrically opposite a longer leg, each of the confronting sides of the legs between the short legs and between each short leg and adjacent longer leg being configured with teeth adapted to restrain movement of a member to be cut whereby the end piece may be rotated 90° when in use for supporting said member to be cut between the short legs when used on substantially level ground and between a longer leg and confronting shorter leg when used on sloping ground;

the confronting sides of said short legs being further sized and configured to laterally restrictively support in a generally horizontal position a piece of rectangular shaped lumber of predetermined size when in use.

14. The molded plastic end piece of claim 13 wherein the end of each said leg is pointed substantially along the centerline thereof, the points of the longer legs being sharper than the points of the shorter legs.

15. A molded plastic sawbuck apparatus comprising:

two end support members and a crossbar, each said end support member having a hub portion and four integrally molded support legs radiating therefrom, two of said legs being shorter than the other two legs;

said crossbar detachably extending between the hub portions of said end support members, the relative angular orientation and length of adjacent legs being such that said sawbuck can be rotated about 90° from a first position wherein a log to be cut is supported between the shorter legs on substantially level ground and a second position wherein a log to be cut is supported between a shorter leg and a longer leg on sloping ground whereby the height a heavy log has to be lifted over the tops of the legs is reduced; and the end of each leg being pointed substantially along the centerline thereof, the points of the longer legs being sharper than the points of the shorter legs.

16. A kit for assembly of a sawbuck comprising:

two identically molded end supports each having a central hub and four legs radiating therefrom, said hub having a bore therethrough of a cross-sectional configuration for assembly with a respective end of a crossbar and having means for detachably securing said end supports to such crossbar;

each end support having two adjacent legs shorter than the other two legs and the ends of the legs being pointed along the centerline thereof, the points of the longer legs being sharper than the points of the shorter legs; the confronting sides of said shorter legs and the confronting sides of at least one shorter leg and one longer leg having teeth configured such as to restrain movement of a member therebetween to be cut, the configuration of the teeth between the shorter legs further being such as to laterally immobilize rectangular shaped pieces of lumber in a generally horizontal position.

* * * * *